(12) United States Patent
Lee et al.

(10) Patent No.: US 9,978,077 B2
(45) Date of Patent: May 22, 2018

(54) INTEGRATED PAYMENT METHOD USING NEAR FIELD COMMUNICATION AND MOBILE TERMINAL USING THE SAME

(71) Applicant: KT Corporation, Seongnam (KR)

(72) Inventors: Sang Yeop Lee, Suwon-si (KR); Jin Woo Kim, Uiwang-si (KR); Ki Min Oh, Seoul (KR)

(73) Assignee: KT Corporation, Seongnam-si (KR)

(*) Notice: Subject to any disclaimer, the term of this patent is extended or adjusted under 35 U.S.C. 154(b) by 0 days. days.

(21) Appl. No.: 14/320,696

(22) Filed: Jul. 1, 2014

(65) Prior Publication Data

US 2014/0316879 A1 Oct. 23, 2014

Related U.S. Application Data

(63) Continuation of application No. 13/274,839, filed on Oct. 17, 2011, now Pat. No. 8,818,851.

(30) Foreign Application Priority Data

Oct. 15, 2010 (KR) .......................... 10-2010-0101050

(51) Int. Cl.
| | |
|---|---|
| *G06Q 30/00* | (2012.01) |
| *G06Q 30/02* | (2012.01) |
| *G06Q 20/32* | (2012.01) |
| *G06Q 20/20* | (2012.01) |

(52) U.S. Cl.
CPC ..... *G06Q 30/0238* (2013.01); *G06Q 20/3278* (2013.01); *G06Q 30/0207* (2013.01); *G06Q 30/0222* (2013.01); *G06Q 30/0225* (2013.01); *G06Q 20/204* (2013.01)

(58) Field of Classification Search
CPC .................................................. G06Q 30/0238
See application file for complete search history.

(56) References Cited

U.S. PATENT DOCUMENTS

| | | | |
|---|---|---|---|
| 7,306,143 B2* | 12/2007 | Bonneau et al. ............. 235/380 |
| 2002/0078209 A1* | 6/2002 | Peng ....................... H04L 29/06 709/227 |
| 2004/0118658 A1* | 6/2004 | Schott .................. G06Q 20/042 194/210 |
| 2008/0154727 A1 | 6/2008 | Carlson |
| 2008/0208688 A1* | 8/2008 | Byerley et al. .................. 705/14 |
| 2009/0076912 A1* | 3/2009 | Rajan .................. G06Q 30/0267 705/14.64 |
| 2010/0010964 A1* | 1/2010 | Skowronek ............ G06Q 30/02 707/E17.108 |

* cited by examiner

*Primary Examiner* — Bennett M Sigmond
*Assistant Examiner* — Scott C Anderson
(74) *Attorney, Agent, or Firm* — Sughrue Mion, PLLC

(57) ABSTRACT

Disclosed herein is a method for performing an integrated payment using Near Field Communication (NFC). The method is performed using a mobile terminal. The mobile terminal receives Radio Frequency Identification (RFID) tag information from a payment system in an NFC scheme. The mobile terminal analyzes the received RFID tag information, and then extracts an integrated payment application which corresponds to the RFID tag information. The mobile terminal drives the integrated payment application and transmits discount benefit information to the payment system.

9 Claims, 8 Drawing Sheets

[FIG. 1]
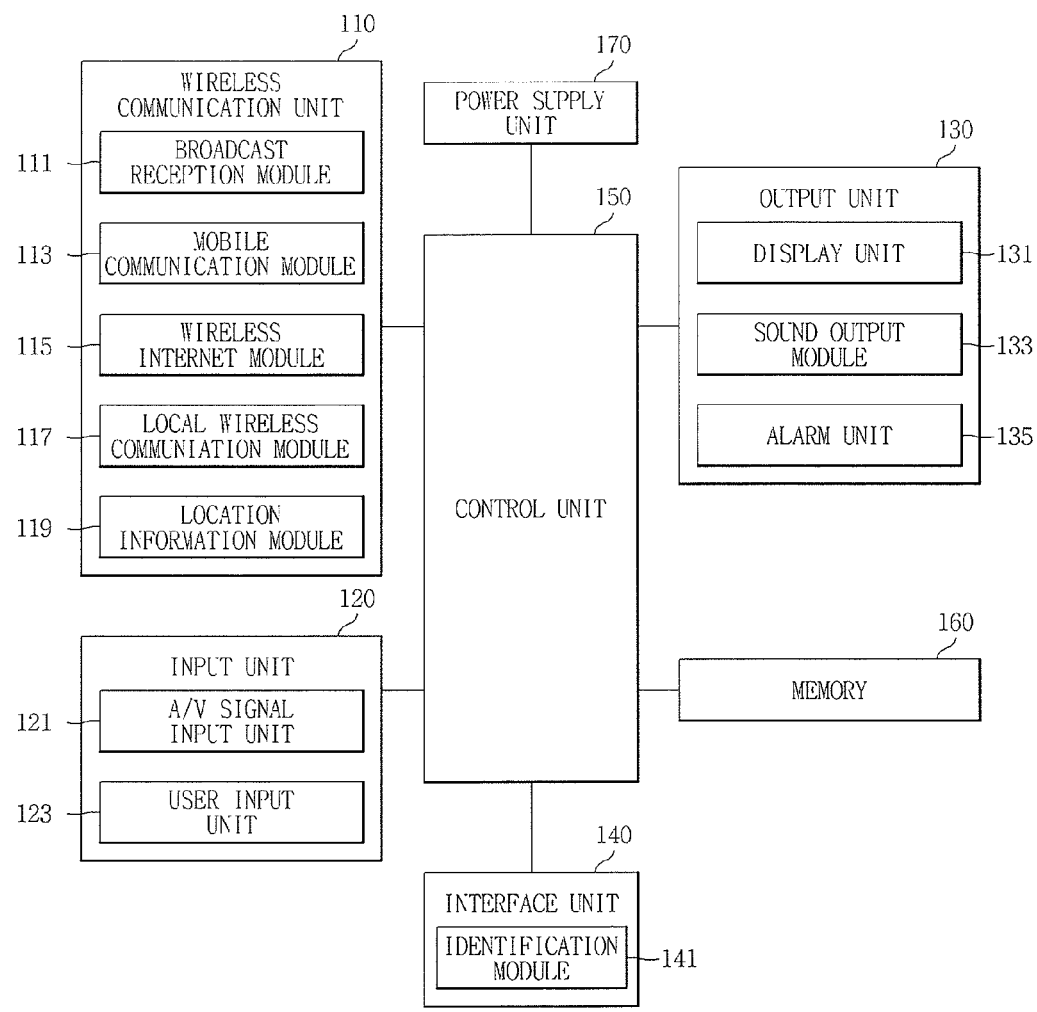

[FIG. 2]
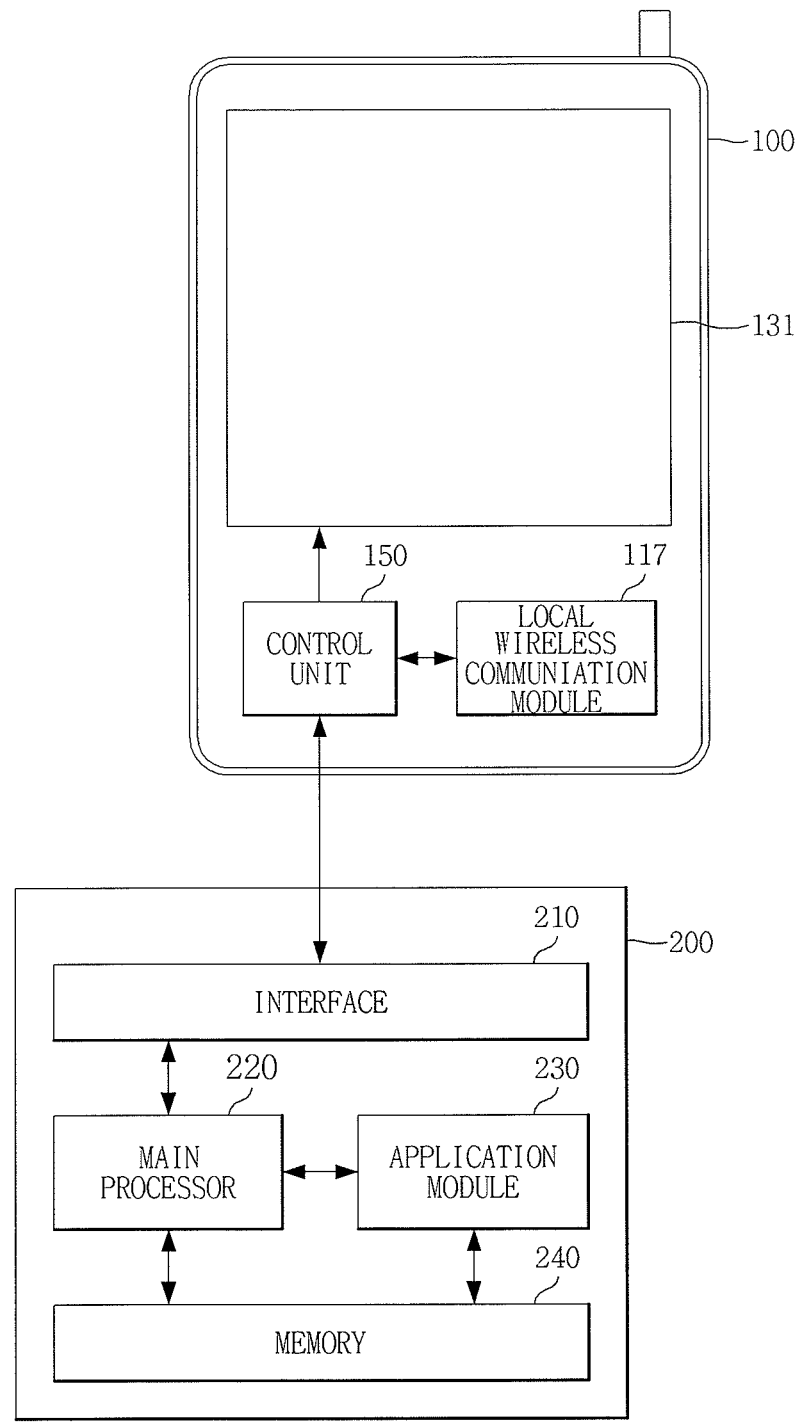

[FIG. 3a]
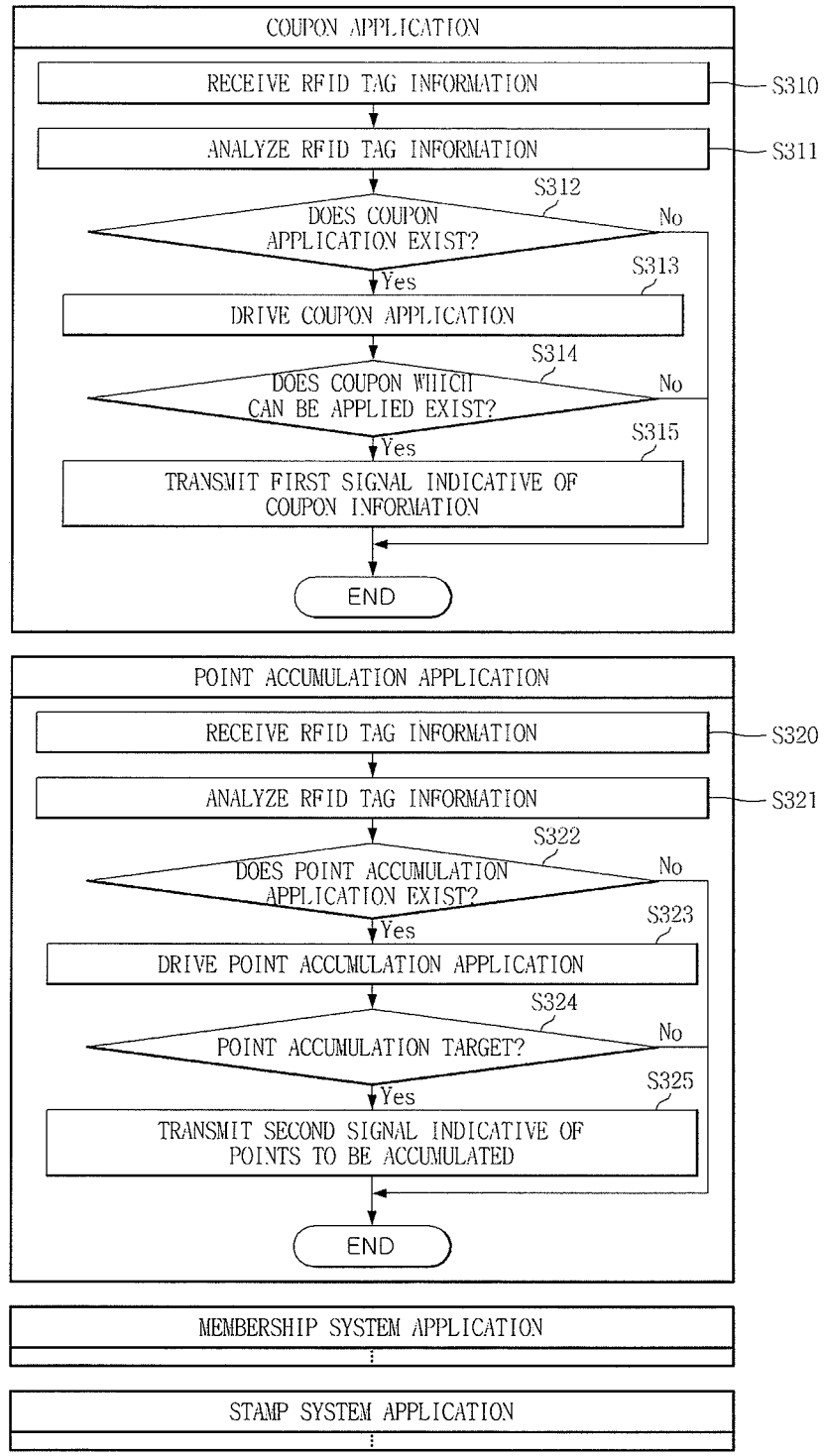

[FIG. 3b]
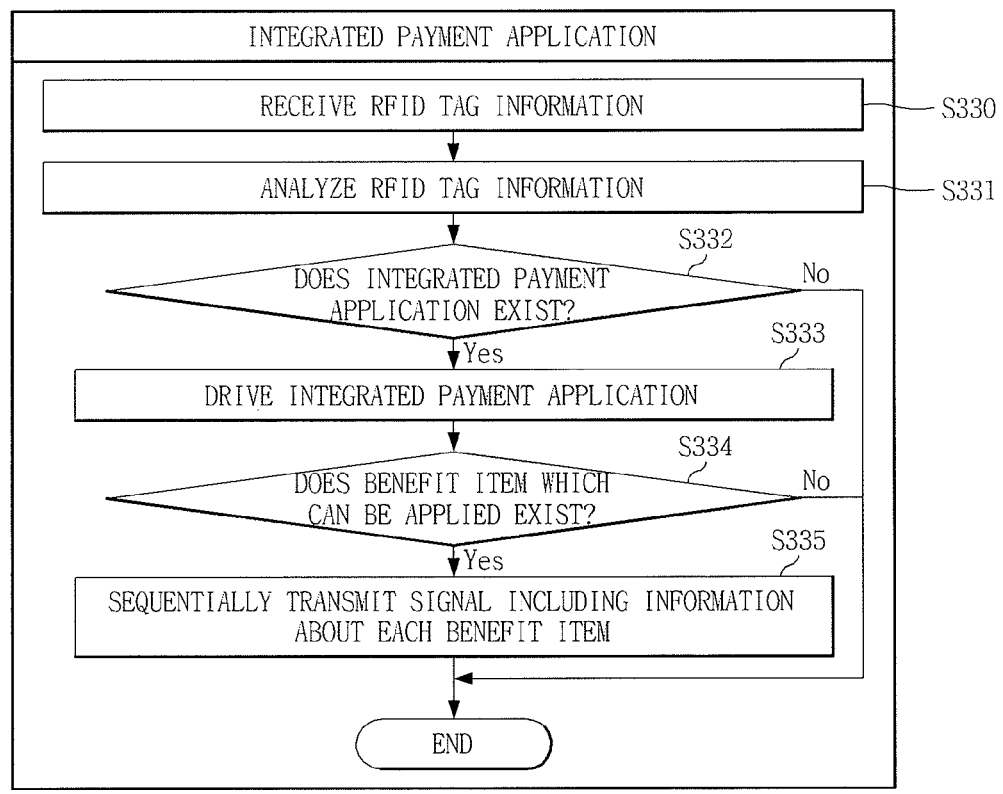

[FIG. 4]
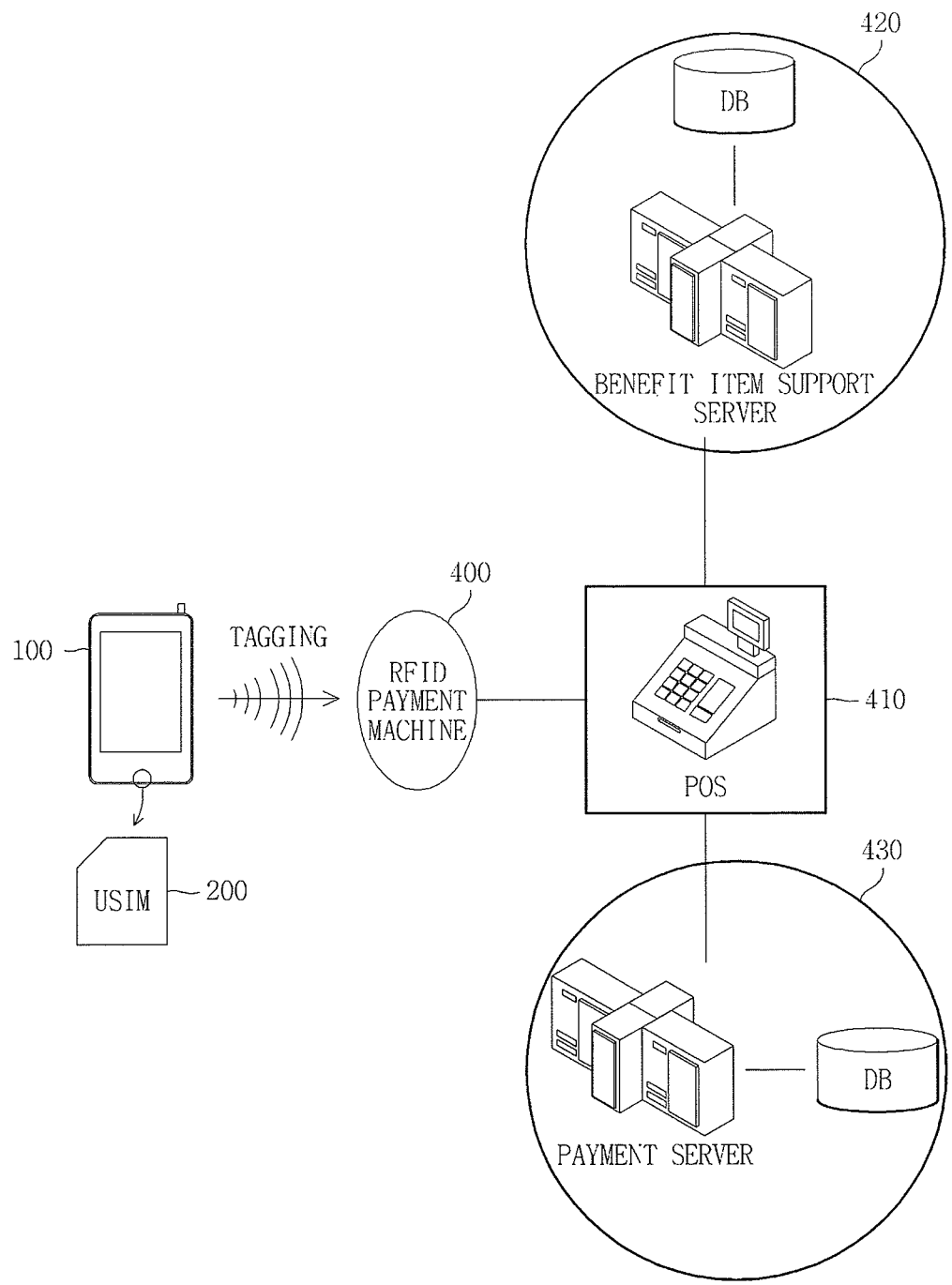

[FIG. 5]
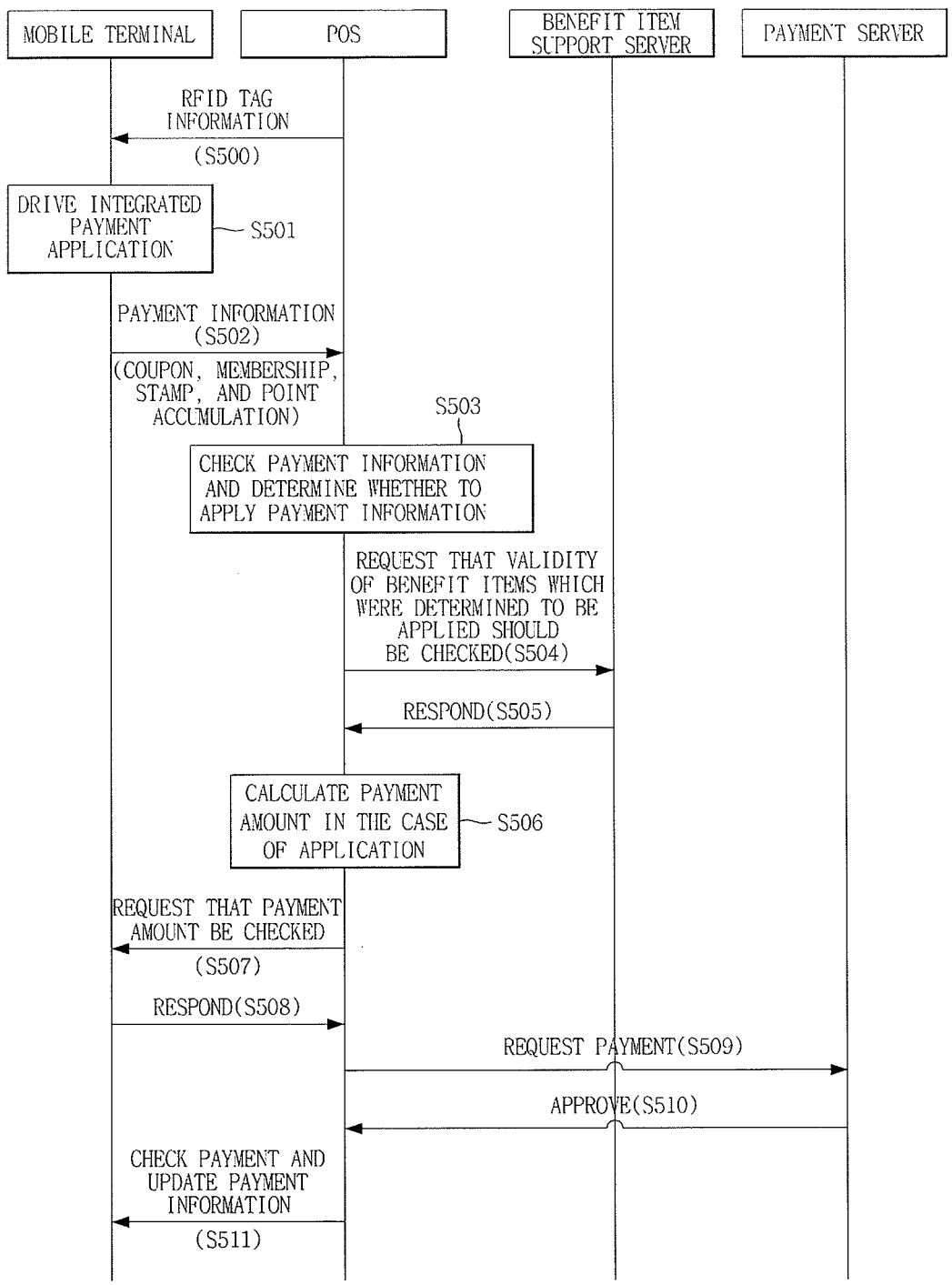

[FIG. 6]
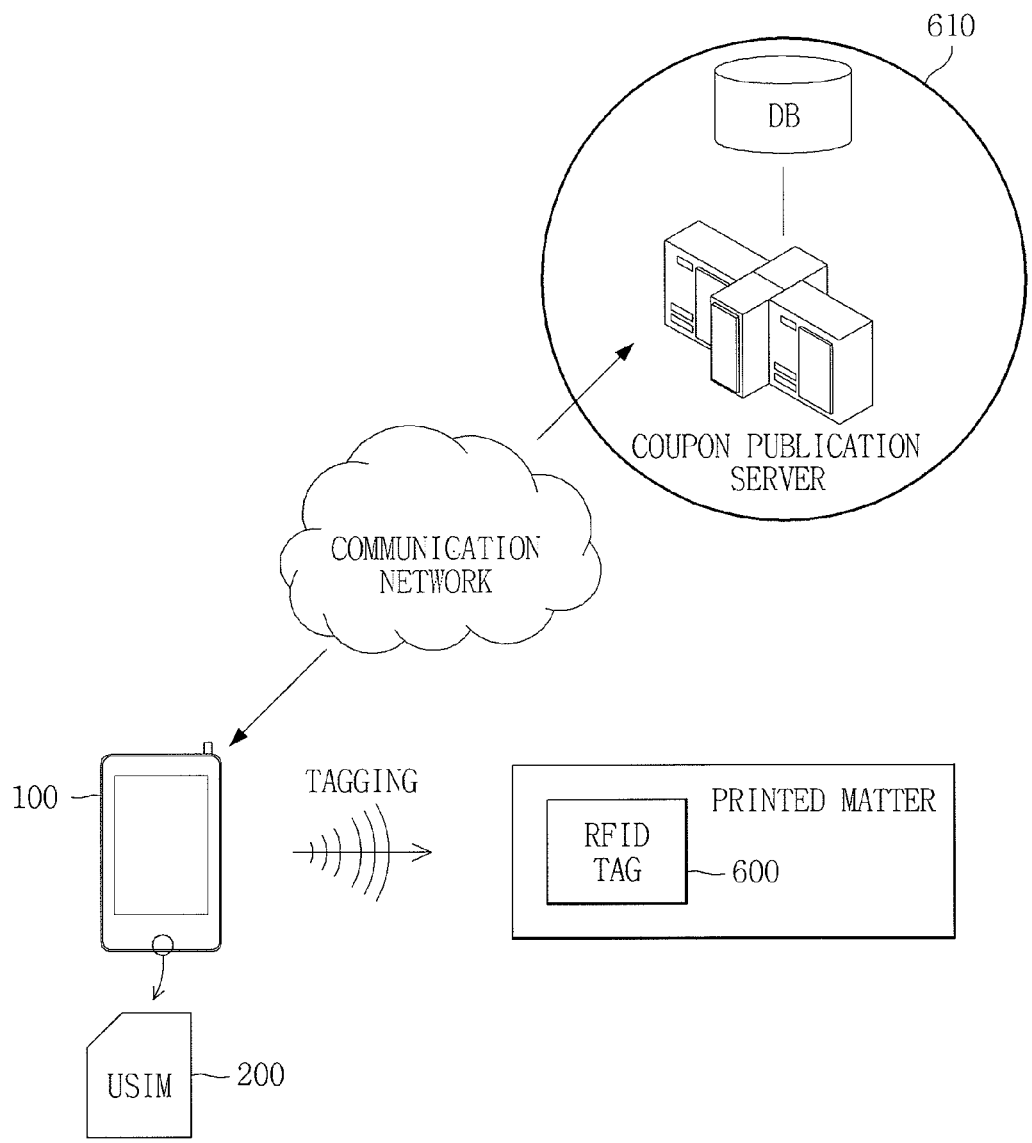

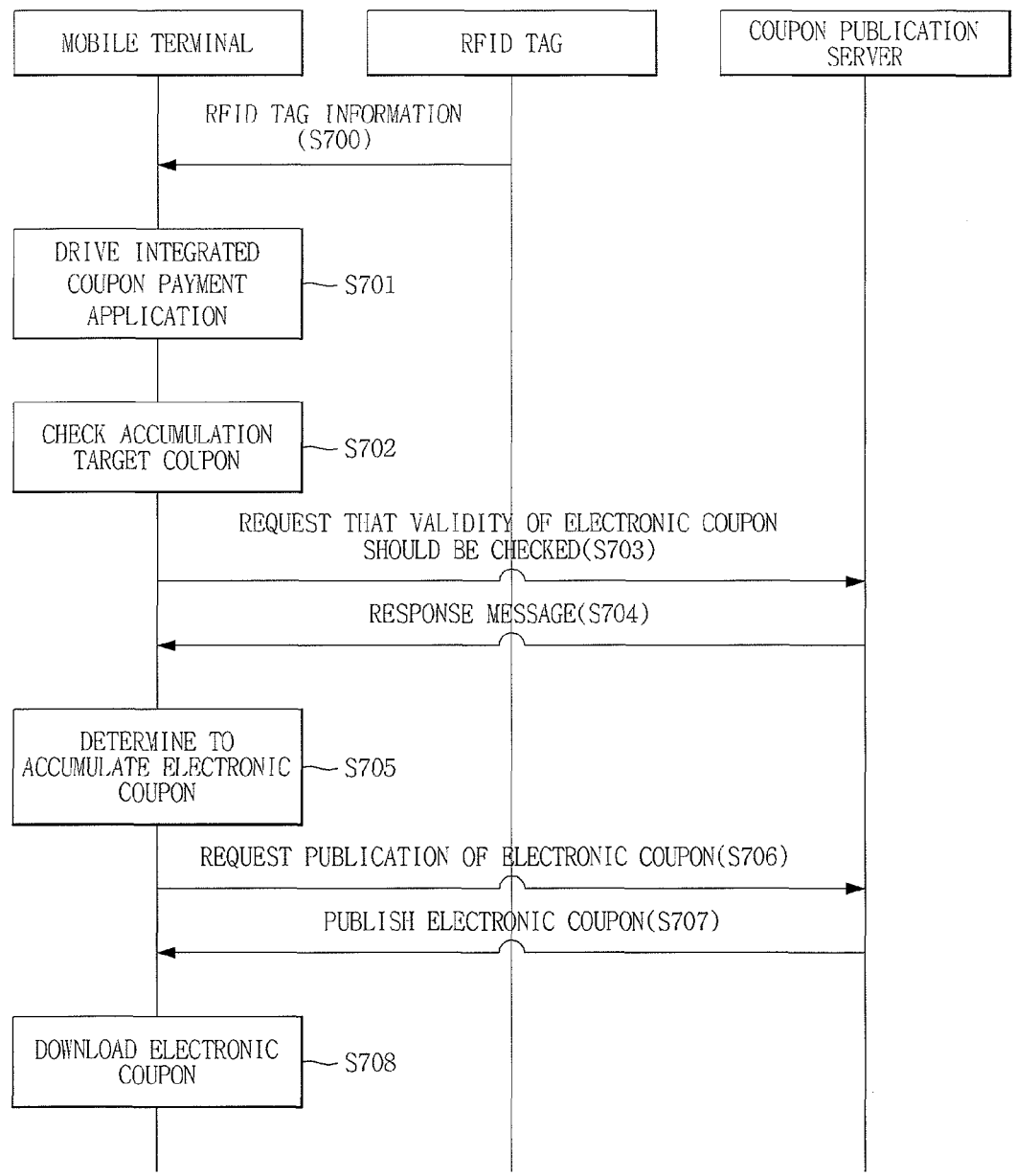

INTEGRATED PAYMENT METHOD USING NEAR FIELD COMMUNICATION AND MOBILE TERMINAL USING THE SAME

CROSS-REFERENCE TO RELATED PATENT APPLICATION

This is a continuation application of U.S. patent application Ser. No. 13/274,839, which claims priority from Korean Patent Application No. 10-2010-0101050, filed on Oct. 15, 2010 in the Korean Intellectual Property Office, the disclosures of which are incorporated herein in their entirety by reference.

BACKGROUND OF THE INVENTION

1. Field of the Invention

The present invention relates generally to an integrated payment scheme using Near Field Communication (NFC) and a mobile terminal using the same, and, more particularly, to a method of integrally processing various types of payment means in a contactless scheme using NFC and then performing payment.

2. Description of the Related Art

The present invention relates to a payment scheme and a system for storing coupons, related to various types of benefits applied to a payment, such as coupons, membership cards, stamps and point accumulation which are published from stores and franchises, in an Integrated Circuit (IC) Chip (or smart card) and a coupon server, respectively, the IC chip and the coupon server being connected with each other, so that the coupons are integratedly applied when a payment is actually performed.

Generally, benefit means applied to a payment, such as coupons, has been published as a means for providing a discount benefit to customers in order to promote sales in various types of stores such as department stores, discount stores, family restaurants, and shopping malls, and such a benefit means applied to a payment has been used offline. However, with the recent explosive development in the Internet infrastructure, online electronic commerce has gradually increased, with the result that online is closely connected to offline, so that multipurpose coupons which can be used both on and offline tend to be activated in such a way as to publish identity information, such as a coupon serial number, in addition to coupons which are simply printed on paper.

However, there are problems of inconvenience because such a coupon should be carried to be used in the state of printed matter or material printed out using a Personal Computer (PC) by a user in the case of offline, and the user should remember or record the provided coupons one by one and then use the coupons.

Further, when coupons published from a store along with an independent membership system or a discount system published form a franchise are both in place, it is troublesome for a customer to provide each printed matter and card in order to apply the discount benefit. Furthermore, it is difficult for customers to recognize all the discount benefits which are applied to a corresponding product and it is bothersome for a seller to explain the discount benefits individually to customers. Therefore, there are rising problems of the omission, forgery, falsification, and illegal use of discount benefits which can be enjoyed by a customer.

Meanwhile, with the development of wireless communication technology and Information Technology (IT), the number of mobile terminals supplies has increased and the development of intelligent mobile terminals (or, smart phones) has been activated, so that provision of various types of additional services using IC Chips (or smart cards), which are published by a communication service provider and provided to users in order to use the user authenticate function and the roaming function of each mobile terminal, is on an uptrend.

Therefore, studies have been conducted on a method of storing discount benefit means in an IC chip so that a user conveniently uses the discount benefit means when a payment is performed using coupons published from many various stores in such a way as to use wireless communication technology, IT technology, mobile terminals carried by almost all users, or a smart card infrastructure.

Further, with the popularization of online coupon publication, a method for storing electronic coupons in a mobile terminal has risen. For example, a customer may actively access a content server provided by a mobile communications company and download an electronic coupon via a communication network, or a store which wants to publish a coupon may publish electronic coupons in the form of Short Message Service (SMS) messages via the server of the communications company.

However, such type of electronic coupon publication is inconvenient because a customer should directly access a specific server and download a coupon, and because it takes a long time to obtain the corresponding coupon.

SUMMARY OF THE INVENTION

Accordingly, the present invention has been made keeping in mind the above problems occurring in the prior art, and an object of the present invention is to provide a method of providing an integrated payment service capable of performing a payment process in such a way that various types of discount benefit information, which can be applied when a product is paid, are integrated into a single piece of payment information.

Another object of the present invention is to provide a method of receiving an electronic coupon using Radio Frequency Identification (RFID) tagging in a Near Field Communication (NFC) scheme unlike a method of directly accessing an electronic coupon publication server and the receiving an electronic coupon.

Technical objectives that the present invention intends to achieve are not limited the above-described objects and other technical objectives which have not been mentioned will be clearly understood by those skilled in the art from the description below.

A method for performing an integrated payment using a mobile terminal in a Near Field Communication (NFC) scheme according to an aspect of the present invention, the method may include receiving Radio Frequency Identification (RFID) tag information using a mobile terminal from a payment system in an NFC scheme; analyzing the received RFID tag information, and extracting an integrated payment application corresponding to the RFID tag information using the mobile terminal; and driving the integrated payment application and transmitting discount benefit information to the payment system using the mobile terminal.

The discount benefit information according to an embodiment of the present invention includes at least one of items related to accumulation or a discount based on coupon, reserved money, a stamp, and a membership system which can be applied when a product is paid for.

The transmitting the discount benefit information to the payment system according to the embodiment of the present invention further includes extracting the discount benefit information which can be applied to a product that a customer desires to pay for from one or more discount benefit items previously stored in the mobile terminal.

The method according to the embodiment of the present invention may further include outputting one or more discount benefit items, found when the integrated payment application is driven, in the predetermined area of the display unit of the mobile terminal; and configuring the discount benefit information in response to an input signal from a user of the mobile terminal.

The method according to the embodiment of the present invention may further include calculating a payment amount computed in such a way as to apply the discount benefit information based on the result of determination of the validity of the discount benefit information and then processing the payment using the payment system.

The method according to the embodiment of the present invention may further include displaying information about the payment amount transmitted to the mobile terminal from the payment system in the predetermined area of the display unit of the mobile terminal.

According to another aspect of the present invention, a mobile terminal for transmitting integrated payment information and performing a payment using NFC may include a wireless communication unit for receiving RFID tag information from a payment system, and transmitting a wireless signal; an identification module for analyzing the received RFID tag information, and extracting and driving an integrated payment application corresponding to the RFID tag information; and memory for storing at least one discount benefit item which can be applied when a product is paid for; wherein the integrated payment application extracts discount benefit information from the discount benefit item.

The wireless communication unit according to the embodiment of the present invention transmits the discount benefit information to the payment system.

The discount benefit information according to the embodiment of the present invention may include at least one of items related to accumulation or a discount based on coupon, reserved money, a stamp, and a membership system which can be applied when a product is paid for.

The mobile terminal according to the embodiment of the present invention may further include a display unit for outputting the discount benefit item extracted when the integrated payment application is driven.

The mobile terminal according to the embodiment of the present invention may further include a user input unit for inputting selection information, used to configure the discount benefit information based on the discount benefit item displayed on the predetermined area of the display unit, by a user.

According to further another aspect of the present invention, a method of storing an electronic coupon using a mobile terminal in an NFC scheme may include receiving RFID tag information including electronic coupon publication information using NFC; analyzing the received RFID tag information and extracting an integrated coupon accumulation application corresponding to the RFID tag information; and accessing an electronic coupon publication server when the integrated coupon accumulation application is driven, and receiving an electronic coupon based on the electronic coupon publication information.

The method according to the embodiment of the present invention may further include transmitting to the electronic coupon publication server a message used to request that the validity of the electronic coupon be checked; and receiving a response message from the electronic coupon publication server in response to the request message.

According to still another aspect of the present invention, a mobile terminal for storing an electronic coupon using NFC may include a wireless communication unit for receiving RFID tag information including electronic coupon publication information using NFC, and transmitting a wireless signal; and an identification module for analyzing the received RFID tag information, extracting and driving an integrated coupon accumulation application corresponding to the RFID tag information; wherein the mobile terminal accesses an electronic coupon publication server when the integrated coupon accumulation application is driven, and receives an electronic coupon based on the electronic coupon publication information.

The mobile terminal according to the embodiment of the present invention may further include memory for storing the received electronic coupon.

The above-described embodiments correspond to the parts of the embodiments of the present invention, and those skilled in the art can extract and understand various embodiments to which technical features of the present invention are included.

BRIEF DESCRIPTION OF THE DRAWINGS

The above and other objects, features and further advantages of the present invention will be more clearly understood from the following detailed description taken in conjunction with the accompanying drawings, in which:

FIG. 1 is a block diagram illustrating a mobile terminal which provides an integrated payment scheme using NFC according to an embodiment of the present invention;

FIG. 2 is a block diagram illustrating an identification module provided in the mobile terminal using NFC according to an embodiment of the present invention;

FIGS. 3A and 3B are views illustrating an example of the process of driving an integrated payment application according to an embodiment of the present invention;

FIG. 4 is a view illustrating an example of a system which provides an integrated payment service according to an embodiment of the present invention;

FIG. 5 is a flowchart of procedures illustrating an example of the process of processing payment using the integrated payment system according to an embodiment of the present invention shown in FIG. 4;

FIG. 6 is a view illustrating an electronic coupon publication system using NFC according to an embodiment of the present invention; and FIG. 7 is a flowchart illustrating an example of a method of storing an electronic coupon using the system of FIG. 6.

DESCRIPTION OF THE PREFERRED EMBODIMENTS

The present invention may be modified into various forms and may include various types of embodiments. Some of the embodiments are illustrated in the drawings and will be described in detail. In the following description, when it is determined that detailed descriptions of related well-known technologies would make the gist of the present invention obscure, they will be omitted.

Although the terms of "first" and "second" may be used to describe various components, the components are not limited by the terms, and the terms are used only for the purpose of distinguishing one component from another component.

The terms used in the present invention are used only to describe specific embodiments, and their intent is not to limit the present invention. The singular number includes a plural number unless it is clearly mentioned differently in the context. In the present specification, the term "include" or "comprise" represents that there are features, numbers, steps, operations, components, elements or the combination thereof which are specified on the specification, and should not understood that the existence or additional possibility of one or more features, numbers, steps, operations, components, elements or the combination thereof are previously excluded.

Hereinafter, embodiments of the present invention will be described in detail with reference to the attached drawings. The detailed descriptions which will be disclosed below with the accompanying drawings are exemplary embodiments of the present invention and are not meant to be the only embodiment in which the present invention can be implemented. The detailed description below includes definite details in order to provide the complete understanding of the present invention. However, those skilled in the art may understand that the present invention may be implemented without the definite details.

The present invention relates to a system for providing an integrated payment service using a mobile terminal in an NFC scheme and relates to an integrated payment scheme.

FIG. 1 is a block diagram illustrating a mobile terminal which provides an integrated payment scheme using NFC according to an embodiment of the present invention.

Referring to FIG. 1, a mobile terminal 100 according to the embodiment of the present invention may include a wireless communication unit 110, an input unit 120, an output unit 130, an interface unit 140, a control unit 150, memory 160 and a power supply unit 170, and is not limited thereto.

The components of the mobile terminal will be described in order.

The wireless communication unit 110 may include one or more modules which enable wireless communication between the mobile terminal 100 and a wireless communication system or between the mobile terminal 100 and a network at which the mobile terminal 100 is located. For example, the wireless communication unit 110 may include a broadcast reception module 111, a mobile communication module 113, a wireless Internet module 115, an local wireless communication module 117, and a location information module 119.

Here, the local wireless communication module 117 is a module for performing local wireless communication, and may be used for Bluetooth, NFC, Radio Frequency Identification (RFID), Infrared Data Association (IrDA), Ultra Wideband (UWB), and ZigBee.

An NFC module may be an example of the local wireless communication module 117 in order to use the payment scheme using NFC which is related to the embodiment of the present invention.

The NFC scheme is a technology used to perform wireless communication of a near distance at a frequency bandwidth of 3.56 MHz, and is used for various types of service such as traffic, tickets, and payments. The RFID technology is used for the NFC scheme. RFID is a technology in which IC chips are provided in a transmission device and a reception device, and information is recognized from a distance using radio waves, and RFID is frequently used for an entrance control system or an electronic payment system. The IC chips are embedded in an RFID tag and an RFID reader.

An RFID tag includes an IC chip and an antenna, and transmits identification information, used to identify an object to which the RFID tag written in the IC chip is attached, to the RFID reader through the antenna. Therefore, the RFID reader may identify each device to which an RFID tag is attached based on the radio frequency.

The input unit 120 may include an Audio/Video (A/V) signal input unit 121 for receiving an audio signal or a video signal, and a user input unit 123 for generating input data used to control the operation of a terminal by a user. The A/V signal input unit 121 may include a camera and a microphone, and the user input unit 123 may include a key pad, a dome switch, a touch pad (static/dynamic), and a jog wheel.

The output unit 130 is used to generate output related to sense of sight, sense of hearing, or sense of touch, and may include a display unit 131, a sound output module 133, and an alarm unit 135. The display unit 131 displays and outputs information processed by the mobile terminal 100. For example, the display unit 131 outputs Short Message Service (SMS) transmitted to the mobile terminal 100 via a mobile communication network or a wireless data communication network.

The interface unit 140 functions as a connection channel for all the external equipment which is connected to the mobile terminal 100, receives data from the external equipment, receives power and then transmits the power to each of the internal components of the mobile terminal 100, or transmits the internal data of the mobile terminal 100 to the external equipment. For example, the interface unit 140 may include a wired/wireless headset port, an external charger port, a wired/wireless data port, a memory card port, a port for connecting a device provided with an identification module (hereinafter referred to as "identification device"), an audio Input/Output (I/O) port, a video I/O port, and an earphone port.

Here, the identification module 141 included in the interface unit 140 is a chip which stores various types of information used to authenticate the usage right of the mobile terminal 100. The identification module 141 may include a User Identify Module (UIM), a Subscriber Identify Module (SIM), and a Universal Subscriber Identity Module (USIM). An identification device included in the identification module 141 may be manufactured in the form of a smart card.

Generally, the smart card is a Subscriber Identify Module provided in a communication terminal which supports Wideband Code Division Multiple Access (WCDMA) which is a 3-generational asynchronous wireless access method, and the smart card may store user identification information and terminal identification information which is used to authenticate a communication terminal.

The control unit 150 generally controls the general operation of the mobile terminal. For example, the control unit 150 may control and process voice telephony, data communication, and video telephony.

The memory 160 may perform the function of storing a program which enables the processing and control of the control unit 150, storing data received using the wireless communication unit 110 or temporarily storing data (for example, a telephone book, messages, audios, still images, and videos) input and output using the input unit 120 or the output unit 130.

The memory 160 may include at least one type of storage medium from among flash memory type memory, hard disk type memory, multimedia card micro type memory, and card type memory (for example, Secure Digital (SD) memory or eXtream Digital (XD) memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, and an optical disk.

The power supply unit 170 receives external power and internal power, and supplies power necessary for each component to be operated under the control of the control unit 150.

The various embodiments described here may be implemented in a recording medium which can be read by a computer or a device similar thereto using, for example, software, hardware, or a combination thereof.

FIG. 2 is a block diagram illustrating an identification module provided in the mobile terminal using NFC according to an embodiment of the present invention, and, in particular, FIG. 2 is a block diagram illustrating a smart card module.

Referring to FIG. 2, the smart card module according to the embodiment of the present invention may include an interface 210, a main processor 220, an application module 230 and memory 240. Further, the smart card module 200 may further include the NFC module or the RFID module of the NFC module 117 included in the mobile terminal, separately.

The interface 210 is connected to the NFC module 117 included in the mobile terminal, configured to receive an RF signal using NFC, and configured to transmit various types of information to the mobile terminal 100 when an application which is set in the smart card is driven.

In a smart card having high-capacity multiple functions, the main processor 220 perform a user identification function, a communication function a and global roaming function, and performs processing operations necessary to provide various types of additional services such as credit card, banking, security exchange, membership and payment. For this purpose, the main processor 220 may operate based on a Java application.

In order to provide various types of additional services in addition to the communication function, the main processor 220 receives and analyzes a radio frequency (for example, an RFID tag signal) received using the local wireless communication module 117. For this purpose, the memory 240 which will be described later stores a plurality of pieces of RFID tag information (for example, frequency information), related to the additional services provided by the corresponding smart card, in the form of a table, the main processor 220 extracts an application matched with the analyzed RFID tag information from an RFID information table stored in the memory 240, and then drives a relevant application.

The application module 230 enables a plurality of applications (applets) which can be driven by the main processor 220 to be stored and a relevant application to be driven. For example, various types of applications, such as an individual information management application, a communication function application, a global roaming function application, a transaction application, an RF tag information analysis application, an Internet access application, and a game application, can be stored and driven. Further, setting can be made such that the RFID tag analysis application is separately executed and a relevant application is driven when the RFID tag information, which has been received using the NFC module 117, is input to the smart card module 200.

Therefore, the main processor 220 may analyze an application corresponding to a received RFID tag signal using the driven RFID tag analysis application, and drive the corresponding application in response to the RFID tag signal.

Flash memory, such as Electrically Erasable Programmable Read-Only Memory (EERPROM), may be used as the application module 230. Additional applications may be downloaded and stored in the application module 230 based on the selection of a user in addition to preset applications.

The memory 240 may store user information such as the unique mobile terminal number of a user, an authentication number, and personal configuration information. Further, the memory 240 may store banking information, credit card information, a phone book, game content, and multimedia information.

Furthermore, in order to provide the integrated payment service according to the embodiment of the present invention, in the smart card module of FIG. 2, the application module 230 may store an integrated payment application capable of integrally applying a coupon, a membership card, a stamp, and point accumulation when a payment is performed, and the memory 240 may store at least one piece of integrated payment transaction information.

FIGS. 3A and 3B are views illustrating an example of the process of driving the integrated payment application according to an embodiment of the present invention.

FIG. 3A illustrates the process of executing respective applications for performing coupon, membership system, stamp application, and point accumulation which can be applied in a payment process when a transaction is performed in an NFC scheme. FIG. 3B illustrates the process of executing the integrated payment application which integrates the processes of the applications related to the coupon, the membership system, the stamp application, and the point accumulation which are performed as shown in FIG. 3A, and then processes the integrated process.

Referring to FIG. 3A, the local wireless communication module 117 receives RFID tag information at step S310, and the main processor 220 analyzes the RFID tag information received from the local wireless communication module 117 and determines that the RFID tag information corresponds to an RFID tag signal relevant to the application of a discount coupon in a transaction process at step S311.

The main processor 220 searches an application table stored in the memory 240 for a discount coupon application at step S312. When the corresponding transaction application exists, the corresponding transaction application is driven at step S313.

When the coupon application is driven according to the embodiment, the main processor 220 searches for a coupon which can be applied to a product that is to be paid for at step S314. When information about the coupon that is to be paid for is checked, a first signal indicative of coupon information is transmitted to a payment server at step S315. Thereafter, the payment server performs the payment process in such a way as to check the validity of the corresponding coupon by using a server provided by a coupon publication enterprise, and then apply the corresponding coupon when the corresponding coupon is determined to be valid.

The above-described steps may be applied to the process of driving a point accumulation application in the same scheme.

Referring to FIG. 3A, the local wireless communication module 117 receives the RFID tag information at step S320, and the main processor 220 analyzes the RFID tag information received from the local wireless communication module 117 and determines that the RFID tag information corresponds to an RFID tag signal relevant to point accumulation in the transaction process at step S321. The process after step S321 is similar to the process of driving the coupon application.

The main processor 220 searches the application table stored in the memory 240 for a point accumulation application at step S322. When the corresponding transaction application exists, the main processor 220 drives the point accumulation application at step S323.

When the point accumulation application is driven, the main processor 220 checks whether a point can be accumulated for a product that is to be paid for at step S324. In the case of a product for which points can be accumulated, a second signal indicative of information about the points to be accumulated is transmitted to the payment server at step S325. Thereafter, the payment server determines the validity of the point accumulation, and then applies the result of the determination to the payment process.

The above-described process may be applied to an application related to a stamp system in which a predetermined product is provided for free when a predetermined number of stamps are gathered whenever the products of a specific enterprise are paid for, or a discount or accumulation application based on a membership system.

Therefore, for example, when a specific product is purchased in a convenience store and a customer tries to perform payment using a mobile terminal in which a payment method-related application is stored in an NFC scheme, relevant applications should be driven respectively in order to apply a discount coupon, benefits according to a membership system, stamp accumulation, and point accumulation to the corresponding product. That is, in order to perform a single transaction, the main processor 220 performs the operation of searching for at least four applications relevant to transaction information and then transmitting signals relevant to the respective applications to the payment server, so that signaling overhead may be generated.

FIG. 3B illustrates the process of driving an integrated payment application capable of integrating various types of payment applications into a single operation and performing the integrated operation, the payment applications respectively operating based on their execution processes as shown in FIG. 3A.

Referring to FIG. 3B, the local wireless communication module 117 receives RFID tag information at step S330. Thereafter, the main processor 220 analyzes the RFID tag information received from the local wireless communication module 117 and determines that the RFID tag information corresponds to an RFID tag signal related to an integrated payment application which integrates benefit items, such as discount or point accumulation, in the transaction process and then process the integrated benefit items at step S331. The process after step S331 is similar to the process of driving the coupon application.

The main processor 220 searches the application table stored in the memory 240 for the integrated payment application at step S332. When the corresponding application exists, the integrated payment application is driven at step S333.

When the integrated payment application is driven, the main processor 220 checks whether there is any benefit item applied to a corresponding product when the corresponding product is paid for at step S334. For example, benefit items, such as the discount coupon of the corresponding product, a membership discount system published from a store, a franchise or a mobile communication company, stamp accumulation, and point accumulation, which can be provided to a customer when a payment is performed, can be integrally searched for.

If, as the result of search, at least one applicable benefit item is found, signals including information about the found benefit items are sequentially transmitted to the payment server at step S335. For example, when a discount coupon for a single product is published and a mobile communication service provider to which a customer has been subscribed supports point accumulation corresponding to a predetermined amount of money for the product and a store supports duplicated discount corresponding to the predetermined amount of money of the corresponding product, the integrated payment application may sequentially transmit information about the three benefits applied to the corresponding product to the payment server. Therefore, when the integrated payment application is driven, signaling overhead may be decreased and the time required to drive an application may be reduced, compared to the case where applications related to the respective discount benefits are separately driven and applied.

The payment system used when the above-described integrated payment application is applied will be described with reference to FIGS. 4 and 5. It is assumed that a credit card application (applet), an electronic money application, and an integrated payment application according to an embodiment of the present invention are set in a mobile terminal shown in FIGS. 4 and 5.

FIG. 4 is a view illustrating an example of a system for providing an integrated payment service according to the embodiment of the present invention.

Referring to FIG. 4, an integrated payment system according to the embodiment of the present invention may include a mobile terminal 100 provided with a smart card 200 in which coupons published from various stores are stored in an electronic scheme, a payment machine 400 provided with an RFID module capable of performing NFC with the mobile terminal 100, a Point Of Sale (POS) system 410 configured to be capable of processing payment in such a way that a payment application provided in the mobile terminal of a customer can be interworked with, a benefit item support server 420 configured to publish and manage discount benefit means when a payment is performed using a coupon or membership, and a payment server 430.

The POS system 410 performs the process of receiving various pieces of discount benefit information which can be applied to a product from the mobile terminal 100 using the RFID payment machine 400, and checking the validity of the discount benefit information using a server supported by a membership company or a seller company which provides each discount benefit. When the validity is determined, the POS system 410 calculates the final payment amount of the corresponding product is calculated and performs the payment process using the payment server 430.

FIG. 5 is a flowchart of procedures illustrating an example of the process of executing the payment process using the integrated payment system according to the embodiment of the present invention shown in FIG. 4.

Referring to FIG. 5, when a user tags the mobile terminal 100 to the RFID payment machine 400 in a contactless scheme in order to pay off a product, RFID tag information is transmitted to the mobile terminal at step S500. The main processor 220 of the smart module of the mobile terminal analyzes the received RFID tag information, and then drives the integrated payment application when the RFID tag information corresponds to frequency information related to the integrated payment application at step S501.

The integrated payment application is driven as described in FIG. 3B, so that the description thereof is omitted. When the integrated payment application is driven, the integrated payment application searches various types of discount benefit items for information about benefit items (hereinafter referred to as "payment information"), such as a coupon, point accumulation, a membership system and a stamp system, which are applied to the corresponding product, and the transmits found payment information to the POS system at step S502.

The POS system which received the payment information checks it (the payment information), and determines desired items which will be applied when the product is paid for at step S503. Here, although the discount benefit items to be applied are not shown in FIG. 5, the discount benefit items are displayed on a monitor attached to a franchise terminal, so that whether to apply the discount benefit items and the priority thereof may be determined based on the selection of a user.

Thereafter, the POS system may transmit a request message, used to request that the validity of the desired discount benefit items should be checked, to each benefit item support server (for example, the provision server of a coupon publisher) at step S504, and may receive a response message at step S505.

The POS system applies the discount benefit items whose validity was checked to the payment and then calculates the final payment amount at step S506, and then transmits a payment amount check request message to the mobile terminal at step S507. Here, the transmission of the check request message may be realized in such a way that data is transmitted in the form of SMS or may be realized in such a way that the message is displayed on the monitor attached to the franchise terminal so that the user can check the message.

When a payment amount check response message is received from a customer at step S508, the POS transmits a message, used to request processing of the corresponding payment amount, to the payment server at step S509, and receives the approval of the payment at step S510. The payment scheme may be performed using various types of payment means, such as a credit card and electronic money, which were published in the mobile terminal.

When the payment process has completed, the POS may transmit at least one of a payment check message and information about the update of a discount benefit item, such as a coupon remaining after having performed the payment, to the mobile terminal at step S511.

When the integrated payment system according to the embodiment of the present invention is used, the various types of discount benefit items stored in the mobile terminal of a customer are not directly checked nor determined to whether being applied whenever a payment is performed. That is, the process of searching for and applying the discount benefit items can be performed when the integrated payment application is driven. Further, with regard to various types of discount benefit items which are provided to attract customers and promote product sales, payment process execution time may be reduced and signaling overhead may be reduced by using the integrated payment application which can perform integrated search while not driving various types of applications.

Next, a method of storing an electronic coupon in a mobile terminal using NFC in a contactless scheme according to another embodiment of the present invention will be described.

Recently, with the popularization of the publication of an online coupon, a method of storing an electronic coupon in a mobile terminal has come to the fore. For example, a customer can download an electronic coupon via a communication network in such a way as to actively access a content server provided by a mobile communication company, such as SKT, KTF, and LGT in Korea, or can publish an electronic coupon in the form of an SMS message via a communication company server at a publisher in which a coupon is published.

However, such a type of publication of an electronic coupon inconveniences a customer because the customer should directly access a specific server and then download the desired coupon, and because the time that is required to obtained the electronic coupon increases.

In order to solve the problems, the present invention proposes a method of simply and promptly storing an electronic coupon using NFC, and the method will be described with reference to FIGS. 6 and 7 below.

FIG. 6 is a view illustrating an electronic coupon publication system using NFC according to an embodiment of the present invention and FIG. 7 is a flowchart illustrating an example of a method of storing an electronic coupon using the system of FIG. 6.

In order to describe the present invention, it is assumed that a customer has downloaded an integrated coupon accumulation execution program via a communication network and stored the program in the embedded memory of a mobile terminal or the memory of a smart card module.

Referring to FIG. 6, the electronic coupon publication system using NFC includes a mobile terminal 100 which is provided with a local wireless communication module 117, a smart card module 200 which stores the integrated coupon accumulation application, which can drive a relevant application and which stores the identification information about a customer, an RFID tag 600 which is used to transmit a wireless signal including electronic coupon information, and a coupon publication server 610. The coupon publication server may be a content server, which was provided by an enterprise which had issued a corresponding electronic coupon, or an integrated coupon provision server.

When the system shown in FIG. 6 is used, a customer may store an electronic coupon in the mobile terminal using an electronic coupon publication-related RFID tag attached to the entrance of a store in an NFC scheme.

In particular, in order to describe the method of storing an electronic coupon using NFC, reference is made to FIG. 7. A customer may access the RFID tag 600 attached to a printed material published by a distributor in a contactless scheme using the mobile terminal 100 in which the integrated coupon accumulation application is executed and the NFC module is mounted. Here, the RFID tag 600 transmits RFID tag information, including information about the electronic coupon publication, to the mobile terminal 100 at step S700.

The electronic coupon information included in the RFID tag information may include information about the unique identification number of a product to which the corresponding coupon can be applied, an approval number, the name of a product which will be paid for and for which the coupon will be used, the discount rate and the amount of money corresponding to accumulated points.

The mobile terminal 100 analyzes the received RFID tag information, determines that the RFID tag information corresponds to frequency information about electronic coupon accumulation, and drives the integrated coupon accumulation application at step S701.

When the integrated coupon accumulation application is driven, the main processor of the smart module provided in the mobile terminal checks whether the corresponding electronic coupon corresponds to an accumulation target coupon at step S702. If the corresponding electronic coupon is the accumulation target, the mobile terminal transmits a request message, used to request that the validity of the corresponding electronic coupon should be checked, to the coupon publication server 610 via a communication network at step S703.

Therefore, the coupon publication server 610 may check the validity of the electronic coupon in a way that takes into account personal information about the customer (for example, a customer name and a mobile phone number) and information about the service period of the corresponding electronic coupon and about the type of business, which are transmitted together with the request message used to request that the validity of the corresponding electronic coupon should be checked, from the mobile terminal.

Thereafter, when a response message in which the validity of the electronic coupon has been checked is received from the coupon publication server 610 at step S704, the mobile terminal determines whether to accumulate the electronic coupon at step S705. Whether to accumulate the electronic coupon may be autonomously determined by the control unit or the main processor depending on the memory storage space of the mobile terminal or the smart module, or may be determined based on the selection of a user. When the determination is made based on the selection of the user, a message used to determine whether the corresponding electronic coupon is accumulated is displayed on the display unit, so that a user input signal may be easily used.

When it is determined to accumulate the electronic coupon, the mobile terminal accesses the coupon publication server and requests publication of the electronic coupon at step S706. Therefore, the coupon publication server publishes the electronic coupon to the mobile terminal at step S707, and the published electronic coupon is stored in the memory of the mobile terminal or the memory of the smart card module at step S708.

Although FIGS. 6 and 7 illustrate an example of the case of electronic coupon publication, the present invention is not limited thereto and can be applied to point accumulation and stamp accumulation. Further, the present invention may be applied to the process of downloading some of various types of benefit items, such as coupons, points, and stamp accumulation, which can be used when a payment is performed.

According to one aspect of the present invention, the present invention may provide a method of providing an integrated payment service capable of performing a payment process in such a way that various types of discount benefit information, which can be applied when a product is paid, are integrated into a single piece of payment information.

Further, since the present invention uses an application for providing an integrated payment service, the time required to process a payment may be reduced and signaling overhead generated when processing the payment may be decreased.

Meanwhile, according to another aspect of the present invention, since information about electronic coupon publication can be obtained using NFC, an electronic coupon can be easily and simply received in a mobile terminal unlike an existing method of directly accessing a coupon publication server and the receiving a coupon by a user.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing an integrated payment at a mobile terminal which is configured to be electrically connected to a smart card module through an interface of the mobile terminal and to communicate with a payment system via a Near Field Communication (NFC), the method comprising:
   receiving, by a wireless communication unit of the mobile terminal, from a product, a radio frequency identification (RFID) tag signal;
   analyzing, by a smart card module in the mobile terminal, the received RFID tag signal;
   extracting, by the smart card module in the mobile terminal, based on the analyzed RFID tag signal, an integrated payment application which is stored in the mobile terminal and which corresponds to the analyzed RFID tag signal, the integrated payment application capable of integrally processing at least two of an application related to a coupon, an application related to a membership card, an application related to a stamp, and an application related to a point accumulation when a payment for the product is performed;
   executing, by the smart card module in the mobile terminal, the extracted integrated payment application;
   searching, by the integrated payment application executed by the mobile terminal, for a plurality of discount benefit items among various types of discount benefit items stored in the mobile terminal, the plurality of discount benefit items being configured to be applied to a product that a customer desires to pay for;
   generating, by the smart card module in the mobile terminal, information related to the searched plurality of discount benefit items and transmitting, by the wireless communication unit of the mobile terminal via the NFC, the generated information to the payment system;
   receiving, by the wireless communication unit of the mobile terminal via the NFC, a final payment amount which reflects at least one of the plurality of discount benefit items from the payment system; and
   receiving, by the wireless communication unit of the mobile terminal via the NFC, information about an update of at least one of the various types of discount benefit items from the payment system,
   wherein the extracting the integrated payment application comprises searching an application table stored in the mobile terminal for the integrated payment application corresponding to the analyzed RFID tag signal.

2. The method of claim 1, further comprising transmitting a payment amount check response message to the payment system, the payment amount check response message being transmitted in response to a payment amount check request message which includes the final payment amount and is transmitted from the payment system.

3. The method of claim 2, further comprising receiving a payment check message from the payment system, the payment check message being transmitted from the payment system when a payment process has completed.

4. The method of claim 1, further comprising determining the at least one of the plurality of discount benefit items among the plurality of discount benefit items based on a selection of a user.

5. The method of claim 4, further comprising determining a priority applicable to the at least one of the plurality of discount benefit items based on a selection of the user.

6. The method of claim 1, wherein the at least one of the plurality of discount benefit items is selected among the plurality of discount benefit items based on validities of the plurality of discount benefit items, the validities being checked by the payment system.

7. The method of claim 1, wherein the various types of discount benefit items includes at least one of a discount coupon, a discount membership, a stamp accumulation, and a point accumulation.

8. The method of claim 1, wherein the payment system includes at least one of a RFID payment machine, a point of sale system, a benefit item support server and a payment server.

9. The method of claim 1, wherein the mobile terminal includes an identity module which stores all or part of the integrated payment application.

\* \* \* \* \*